United States Patent
Walz et al.

[15] 3,683,013
[45] Aug. 8, 1972

[54] COMPOUNDS CONTAINING SULPHONIC ACID GROUPS

[72] Inventors: Klaus Walz, Leverkusen-Wiesdorf; Walter Hees, Cologne-Hoehenberg; Mathieu Quaedvlieg, Opladen, all of Germany

[73] Assignee: Farbenfabriken Bayer Aktiengesellschaft, Leverkusen, Germany

[22] Filed: Feb. 18, 1970

[21] Appl. No.: 12,454

[30] Foreign Application Priority Data

Feb. 27, 1969 Germany..........P 19 09 966.2

[52] U.S. Cl..................................260/512 R, 8/23
[51] Int. Cl............................................C07c 143/42
[58] Field of Search..................................260/512 R

[56] References Cited

UNITED STATES PATENTS

| | | | |
|---|---|---|---|
| 2,366,133 | 12/1944 | Suter | 260/512 |
| 2,766,263 | 10/1956 | Hahn et al. | 260/512 |
| 2,953,597 | 9/1960 | Gedeon et al. | 260/512 |

*Primary Examiner*—Daniel D. Horwitz
*Attorney*—Plumley & Tyner

[57] ABSTRACT

Compounds containing sulphonic acid groups of general formula

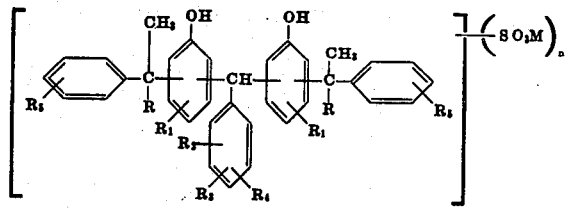

in which R denotes hydrogen or a methyl group, $R_1$ denotes hydrogen, an alkyl, cycloalkyl, aralkyl or aryl group or a halogen atom, $R_2$, $R_3$ and $R_4$ independently of one another denote hydrogen, a methyl, methoxy, hydroxyl or nitro group or a halogen atom, $R_5$ denotes hydrogen or a methyl or ethyl group, n denotes a number between 2 and 4 and M denotes hydrogen, an alkali or alkaline earth atom or an ammonium group, a process for their manufacture and their use as dyeing auxiliaries when dyeing natural and synthetic polyamides with 1:2-metal complex dyestuffs.

7 Claims, No Drawings

COMPOUNDS CONTAINING SULPHONIC ACID GROUPS

The present invention relates to compounds containing sulphonic acid groups; more particularly it concerns compounds containing sulphonic acid groups of general formula

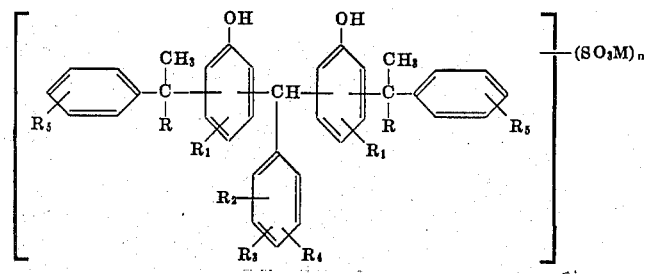

I in which

R denotes hydrogen or a methyl group, $R_1$ denotes hydrogen, an alkyl, cycloalkyl, aralkyl or aryl group or a halogen atom, $R_2$, $R_3$ and $R_4$ independently of one another denote hydrogen, a methyl, methoxy, hydroxyl or nitro group or preferably a halogen atom, $R_5$ denotes hydrogen or a methyl or ethyl group, n denotes a number between 2 and 4 and M denotes hydrogen, an alkali or alkaline earth ion or an ammonium group, a process for their manufacture and their use as dyeing auxiliaries when dyeing natural and synthetic polyamides with 1:2-metal complex dyestuffs.

For $R_1$, possible alkyl groups are especially $C_1-C_{16}$—alkyl groups, preferably $C_6-C_{12}$-alkyl groups, for example the methyl, ethyl, iso-propyl, n-hexyl, n- and iso-octyl, n- and isononyl, iso-dodecyl and hexadecyl group, possible cycloalkyl groups are especially the cyclohexyl group, possible aralkyl groups are especially the benzyl and the phenylethyl group, and a possible aryl group is especially the phenyl group. As halogen atoms, chlorine and bromine atoms may especially be mentioned for $R_1$.

For M, alkali ions which may be mentioned are above all the sodium and potassium ion, and alkaline earth ions especially the magnesium and calcium ion. Apart from the ammonium group itself, possible ammonium groups are especially those which are derived from aliphatic amines, such as diethylamine and triethylamine or monoethanolamine, diethanolamine and triethanolamine, cycloaliphatic amines, such as cyclohexylamine, and cyclic amines, such as piperidine, morpholine or pyridine.

The compounds containing sulphonic acid groups according to the invention are obtained by sulphonation of condensation products of formula

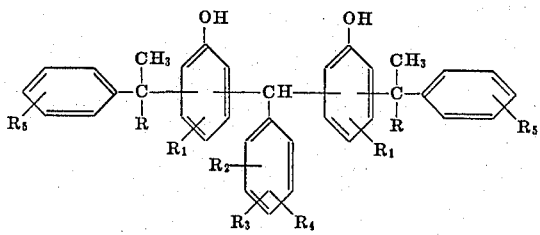

II in which

R, $R_1$, $R_2$, $R_3$, $R_4$ and $R_5$ have the meaning given in the case of formula I, with the usual sulphonating agents, for example sulphuric acid, sulphur trioxide or its addition compounds, such as oleum or chlorosulphonic acid, and optionally subsequent neutralization of the free sulphonic acids with alkali or alkaline earth oxides, hydroxides or carbonates, ammonia or amines.

The sulphonation can advantageously be carried out in organic solvents which are inert towards sulphonating agents, for example chlorinated hydrocarbons, such as chloroform, carbon tetrachloride, trichlorethylene or trichlorethane, or ethers, such as diethyl ether and dioxane, at temperatures between 0° and 80° C. The sulphonating agents are used in such an amount that there are 2 – 4 sulphonic acid groups for each molecule of formula II.

The condensation products on which the compounds containing sulphonic acid groups, according to the invention, are based can be manufactured in a manner which is in itself known. They can for example be manufactured by condensation of phenols with benzaldehydes in the ratio of 2 : 1 with elimination of water, in the presence of acid catalysts, such as $H_2SO_4$, toluene sulphonic acid, $BF_3$ and its addition compounds, $ZnCl_2$, $AlCl_3$ or $SnCl_4$ at temperatures between 50° and 120° C., and reaction of the resulting precondensates with styrene, $\alpha$-methylstyrene, vinyltoluene or ethylstyrene at 20° – 120° C. in the presence of the above-mentioned acid catalysts, preferably $BF_3$ and its addition compounds. Inert solvents, such as hydrocarbons, for example hexane, octane, cyclohexane, benzene, toluene, xylene or chlorinated hydrocarbons, for example carbon tetrachloride, can optionally be added.

Possible phenols for the manufacture of the condensation products are those aromatic hydroxyl compounds which contain at least two reactive hydrogen atoms in the nucleus, for example phenol, cresols, isopropylphenols, hexylphenols, octylphenol, nonylphenol, iso-nonylphenol, iso-dodecylphenol, hexadecylphenol, cyclohexylphenols, hydroxydiphenylmethane, hydroxydiphenyl as well as chlorophenols and bromophenols.

Possible benzaldehydes are especially benzaldehyde, toluylaldehydes, salicyladldehyde, mono-, di- and trichlorobenzaldehydes, nitrobenzaldehyde, methoxybenzaldehydes and chloro-nitrobenzaldehydes.

The dyeing of the polyamide materials with 1:2-metal complex dyestuffs in the presence of the compounds containing sulphonic acid groups, according to the invention, can be carried out by introducing the goods to be dyed into an aqueous liquor warmed to 40° – 50° C. which contains the 1:2-metal complex dyestuffs, the compounds of formula I to be used according to the invention, and acids, for example acetic acid, then raising the temperature of the dyebath gradually to 100° – 130° C., and maintaining it at this temperature until it is exhausted. It has proved particularly advantageous to pre-treat the goods to be dyed with an aqueous liquor which only contains the compounds containing sulphonic acid groups and acids, for a short time at 40° – 50° C. and only then to add the dyestuffs to the liquor at temperatures between 40° and 98° C., subsequently to raise the temperature of the dyebath gradually to 100° – 130° C., and to maintain it at this temperature until it is exhausted.

The amounts in which the compounds of formula I are added to the dyebaths can vary within wide limits; they can be easily established by preliminary experiments. In general, depending on the desired depth of color, amounts of 0.5 – 3 percent by weight, relative to the weight of the goods being dyed, have proved successful.

The dyeing process is suitable for natural polyamides, such as wool and silk, and especially for all synthetic polyamides, such as polycaprolactam, polyhexamethylenediamineadipate or poly-ω-amino-undecane-acid.

Using the process according to the invention it proves possible to dye polyamide fiber materials in the most diverse processing forms, for example as flock, tops, texturized filaments, tows, yarn, woven fabrics, knitted fabrics or fleece extremely uniformly with 1:2-metal complex dyestuffs; in particular, the streaky dyeing which easily occurs when dyeing woven fabrics or knitted fabrics of synthetic polyamides is avoided.

The parts indicated in the examples which follow are parts by weight.

EXAMPLE 1

A solution of 140 parts of the condensation product described below in 120 parts of carbon tetrachloride is slowly treated with 60 parts of chlorosulphonic acid at 10° – 20° C. After completion of the addition, the mixture is stirred for a further 5 hours at 20° C. and subsequently neutralized with dilute sodium hydroxide solution. After distilling off the solvent and the water in vacuo, 190 of a solid water-soluble resin remain.

The condensation product used had been manufactured in the following manner:

A mixture of 220 parts of iso-nonylphenol and 2 parts of concentrated sulphuric acid was slowly treated with 53 parts of benzaldehyde at 110° – 120° C. After stirring for 2 hours the water was distilled off in vacuo. The condensation product was treated with 100 parts of carbon tetrachloride and 3 parts of boron fluoride-diacetic acid. Thereafter 104 parts of styrene were added dropwise at 50° – 60° C. and the mixture stirred for a further 5 hours at this temperature. The catalyst was then precipitated by passing in ammonia, the reaction solution was filtered, and the filtrate was freed of solvent in vacuo.

EXAMPLE 2

A solution of 70 parts of the condensation product described below in 60 parts of dichlorethane is slowly treated with 29 parts of chlorosulphonic acid at 10° C. After completion of the addition, the mixture is stirred for 5 hours at 30° – 40° C. and subsequently neutralized with dilute sodium hydroxide solution. After distilling off the solvent and the water in vacuo, 95 parts of a solid water-soluble resin remain.

The condensation product used had been obtained in the following manner:

A mixture of 176 parts of p-cyclohexylphenol and 2 parts of sulphuric acid was treated with 70.5 parts of p-chlorobenzaldehyde at 110° – 120° C. After stirring for a further 2 hours, the water formed was distilled off in vacuo and the resulting residue was dissolved by means of 100 parts of toluene and 2.5 parts of boron fluoride-etherate. 118 parts of vinyltoluene were added dropwise to this solution at 40° – 50° C. The reaction mixture was then stirred for 5 hours at 40° – 50° C. and the catalyst was subsequently precipitated by passing in ammonia. After filtering off the precipitate, the solvent was distilled off in vacuo.

EXAMPLE 3

A solution of 80 parts of the condensation product described below in 65 parts of carbon tetrachloride is slowly treated with 34.8 parts of chlorosulphonic acid at 10° – 20° C. After stirring for a further 5 hours at 40° C., the mixture is neutralized with aqueous ammonia. Thereafter the solvent and water are distilled off in vacuo. 109 parts of a solid water-soluble resin are obtained.

The condensation product used had been manufactured in the following manner:

A mixture of 262 parts of iso-dodecylphenol and 3 parts of sulphuric acid was treated with 53 parts of benzaldehyde at 120° C. After stirring for a further 3 hours, the water was distilled off in vacuo. The residue was treated with 200 parts of benzene, 3 parts of boron fluoride-diacetic acid and subsequently slowly at 50° C. with 104 parts of styrene. After stirring for a further 5 hours, the catalyst was precipitated with ammonia and filtered off and the solvent was distilled off in vacuo.

EXAMPLE 4

A solution of 87.5 parts of the condensation product described below in 50 parts of carbon tetrachloride is slowly treated with 37.5 parts of chlorosulphonic acid at 10° – 20° C. After stirring for a further 5 hours at 30° – 40° C. the mixture is neutralized with dilute sodium hydroxide solution. Thereafter the solvent and water are distilled off in vacuo. 120 parts of a water-soluble solid resin are obtained.

The condensation product used had been manufactured in the following manner:

A mixture of 70 parts of nonylphenol and 1 part of sulphuric acid was treated with 28 parts of 2,4-dichlorobenzaldehyde at 110° C. After stirring for a further 2 hours, the water was distilled off in vacuo. The residue was dissolved in 70 parts of carbon tetrachloride and 1 part of boron fluoride-etherate and then slowly treated with 33 parts of styrene at 50° – 60° C. After stirring for 5 hours at 50° – 60° C., the catalyst was precipitated with ammonia, filtered off, and the solvent distilled off in v vacuo.

EXAMPLE 5

A solution of 74 parts of the condensation product described below in 70 parts of carbon tetrachloride is slowly treated with 30 parts of chlorosulphonic acid at 10° C. After stirring for 5 hours at 30° – 40° C. the mixture is neutralized with dilute sodium hydroxide solution. Thereafter the solvent and water are distilled off in vacuo. 90 parts of a water-soluble solid resin are obtained.

The condensation product used had been manufactured in the following manner:

A mixture of 176 parts of o-cyclohexylphenol and 3 parts of sulphuric acid was treated with 88 parts of 2,4-dichlorobenzaldehyde at 110° – 120° C. After stirring for a further 3 hours the water was distilled off in vacuo. The residue was dissolved in 200 parts of toluene and 3 parts of boron fluoride-etherate and subsequently slowly treated with 118 parts of α-methylstyrene at 60° C. After stirring for a further 5 hours the catalyst was precipitated with ammonia, the precipitate was filtered off and the solvent was distilled off in vacuo.

EXAMPLE 6

A solution of 70 parts of the condensation product described below in 80 parts of dichloroethane is slowly treated with 30.5 parts of chlorosulphonic acid at 10° – 20° C. The mixture is stirred for 5 hours at 30° – 40° C. and subsequently neutralized with 39 parts of triethanolamine. After distilling off the solvent, a water-soluble resin remains.

The condensation product used had been obtained in the following manner:

A mixture of 262 parts of iso-dodecylphenol and 3 parts of sulphuric acid was slowly treated with 60 parts of p-toluylaldehyde at 120° C. After stirring for 3 hours at 120° C. the water was distilled off in vacuo. The residue was dissolved in 200 parts of carbon tetrachloride and 3 parts of boron fluoride-etherate. 104 parts of styrene were slowly added dropwise to this solution at 60° C. After stirring for 5 hours, the catalyst was precipitated with ammonia, the precipitate was filtered off and the solvent was distilled off in vacuo.

EXAMPLE 7

A solution of 70 parts of the condensation product described in Example 4 in 100 parts of dichlorethane is slowly treated with 32.5 parts of chlorosulphonic acid at 10° – 20° C. The mixture is stirred for 5 hours at 30° – 40° C. and subsequently neutralized with 22 parts of pyridine. After distilling off the solvent, a water-soluble resin remains.

EXAMPLE 8

A solution of 395 parts of the condensation product described below in 250 parts tetrachloroethane is slowly treated with 175 parts chlorosulfonic acid at 10° – 20° C. After stirring for 5 hours at 30° – 40° C. the mixtures is neutralized with dilute sodium hydroxide solution. Thereafter the solvent and water are distilled off in vacuo. 540 Parts of a water-soluble solid resin are obtained. The condensation product used had been manufactured in the following manner:

To mixture of 208 parts nonylphenol and 3 parts of sulphuric acid were added gradually 99 parts of 2,4,5-tri-chlorobenzaldehyde at 90° C. After stirring for 2 hours at 110° – 120° C. the water was distilled off in vacuo. The residue was dissolved in 150 parts tetrachloroethane and 3 parts of boron diacetic acid. To this solution were slowly added 98 parts styrene at 50° – 60° C. After stirring for 5 hours at 50° – 60° C. the catalyst was precipitated with ammonia, the precipitate was filtered off and the solvent was distilled off in vacuo.

EXAMPLE 9

A heat-set woven fabric of polyhexamethylenediamine adipate filaments is introduced, in a liquor ratio of 1 : 20, into a bath warmed to 50° C. and adjusted to a pH-value of 6 with acetic acid, containing 1 g of the compound manufactured according to Example 1 per liter. The material is treated in this bath, which is warmed to 98° C., and 0.5 g per liter of the chromium-(1:2) complex of

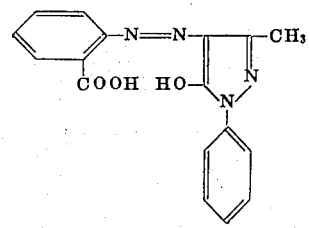

is then added. After dyeing for 60 minutes at 115° C. the liquor has been very extensively exhausted. A completely uniform yellow dyeing is obtained. An equally uniform dyeing was obtained if instead of the compound containing sulphonic acid groups which was used the same amount of one of the products containing sulphonic acid groups described in Examples 2, 3, 6 and 8 was employed.

EXAMPLE 10

A knitted fabric of ε-polycaprolactam filaments is introduced, in a liquor ratio of 1 : 40, into a bath warmed to 50° C. and adjusted to a pH-value of 8 with trisodium phosphate or tetrasodium pyrophosphate, containing 0.75 g of the compound manufactured according to Example 4 per liter. The material is treated in this bath whilst warming to 98° C. and 0.125 g per liter of the chromium-(1:2) complex of

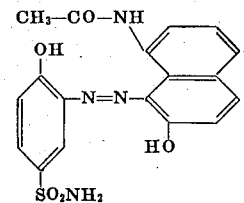

is then added. After about 90 minutes dyeing at 98° C. the liquor is exhausted. A light grey dyeing of outstanding uniformity is obtained. An equally uniform dyeing was obtained if instead of the compound containing sulphonic acid groups which was used the same amount of one of the products containing sulphonic acid groups described in Examples 5, 7 and 8 was employed.

EXAMPLE 11

A knitted fabric of ε-polycaprolactam filaments is introduced, in a liquor ratio of 1 : 30, into a bath warmed to 50° C. and adjusted to a pH-value of 7 with a mixture of monosodium phosphate and disodium phosphate, which contains 0.8 g per liter of the compound manufactured according to Example 4. The material is treated in this bath whilst warming to 98° C. and 0.4 g per liter of the chromium-(1:2) complex of

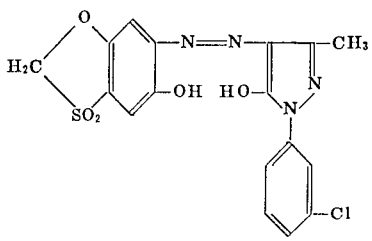

is then added. After a dyeing time of 120 minutes at 98° C. the liquor is practically exhausted. An outstandingly uniform bluish-tinged claret dyeing is obtained.

We claim:

1. Compounds containing sulphonic acid groups of formula

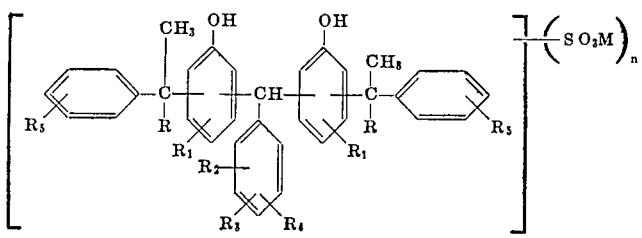

in which

R denotes hydrogen or a methyl group, $R_1$ denotes hydrogen, alkyl groups of one–16 carbon atoms, cyclohexyl, benzyl, phenylethyl, phenyl, or a halogen atom, $R_2$, $R_3$, and $R_4$ independently of one another denote hydrogen, a methyl, methoxy, hydroxyl or nitro group or a halogen atom, $R_5$ denotes hydrogen or a methyl or ethyl group, $n$ denotes a number between 2 and 4 and M denotes hydrogen, an alkali or alkaline earth ion or an ammonium group.

2. Compounds containing sulphonic acid groups of the formula given in claim 1, wherein $R_1$ denotes a $C_6$–$C_{12}$-alkyl- or a cyclohexyl residue and R, $R_2$, $R_3$, $R_4$, $R_5$, $n$ and M have the meaning given in claim 1.

3. Compounds containing sulphonic acid groups of the formula given in claim 1, wherein $R_2$ and $R_3$ denote a chlorine atom and $R_4$ stands for hydrogen or a chlorine atom and R, $R_1$, $R_5$, $n$ and M have the meaning given in claim 2.

4. Process for the manufacture of compounds containing sulphonic acid groups of formula

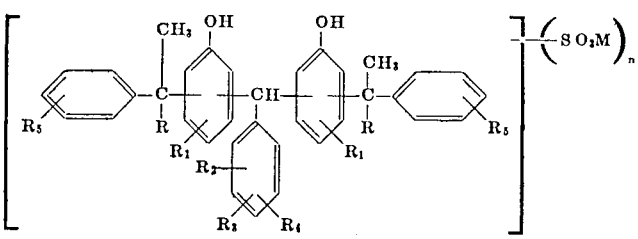

in which

R denotes hydrogen or a methyl group, $R_1$ denotes hydrogen, alkyl groups of one–16 carbon atoms, cyclohexyl, benzyl, phenylethyl, phenyl, or a halogen atom, $R_2$, $R_3$, and $R_4$ independently of one another denote hydrogen, a methyl, methoxy, hydroxyl or nitro group or a halogen atom, $R_5$ denotes hydrogen or a methyl or ethyl group, $n$ denotes a number between 2 and 4 and M denotes hydrogen, an alkali or alkaline earth ion or an ammonium group, characterized in that condensation products of formula

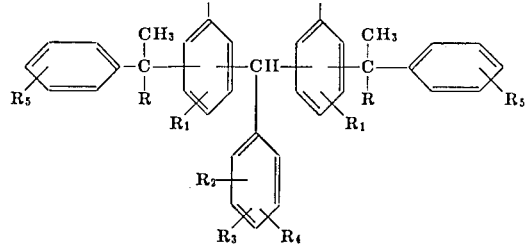

in which

R, $R_1$, $R_2$, $R_3$, $R_4$, and $R_5$ have the above-mentioned significance are sulphonated.

5. Process according to claim 4 for manufacturing of such sulphonic acid groups containing compounds of the formula given in claim 4 wherein $R_2$ and $R_3$ denote a chlorine atom and $R_4$ stands for hydrogen or a chlorine atom and R, $R_1$, $R_5$, $n$ and M have the meaning given in claim 4.

6. The process of claim 4 wherein said condensation product is sulphonated in an organic solvent which is inert towards the sulphonating agents employed.

7. The process of claim 4 wherein said sulphonation is carried out using as sulphonating agents a compound selected from the group consisting of sulfuric acid, sulfur trioxide, oleum, and chlorosulphonic acid.

* * * * *